UNITED STATES PATENT OFFICE.

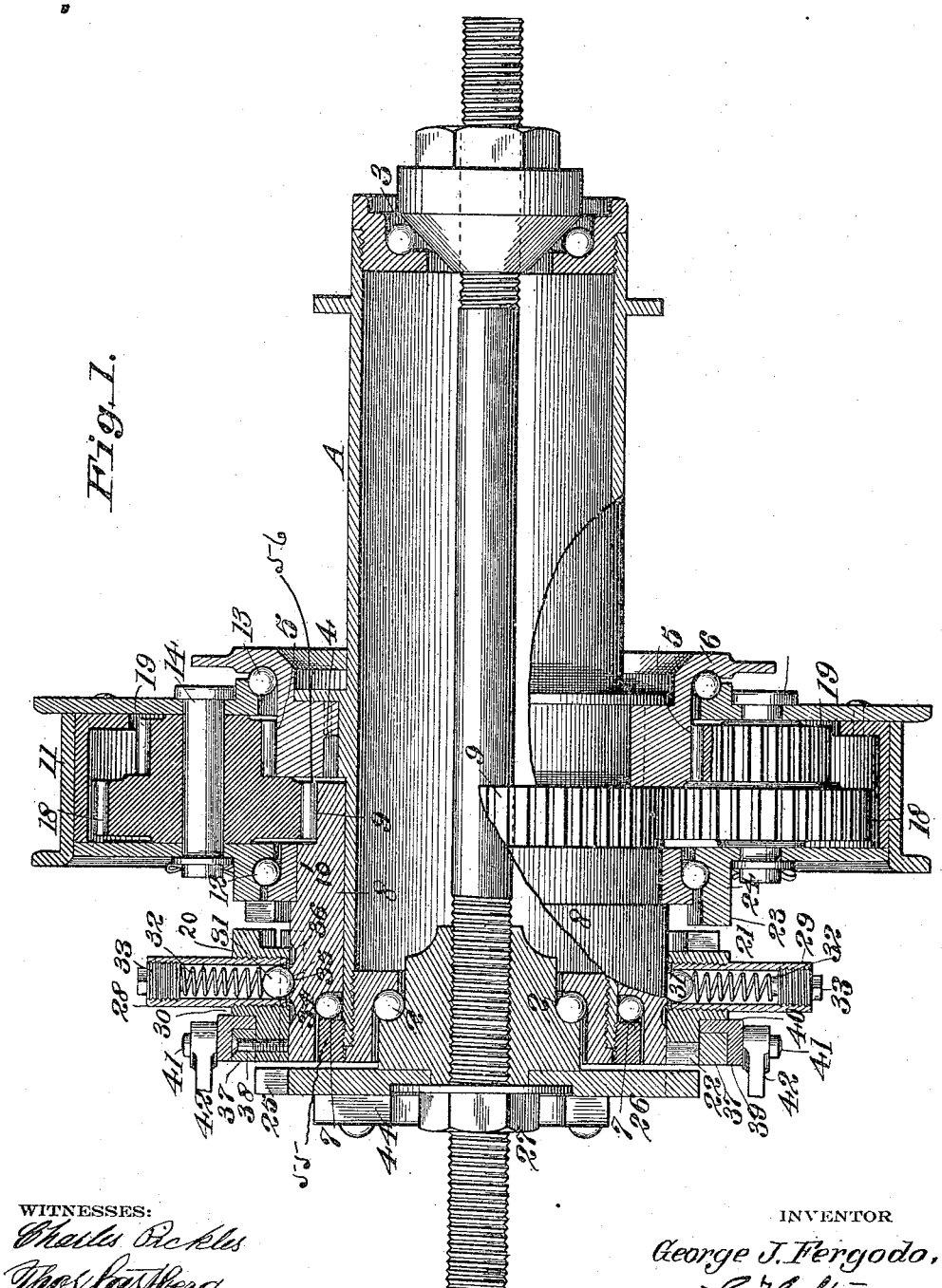

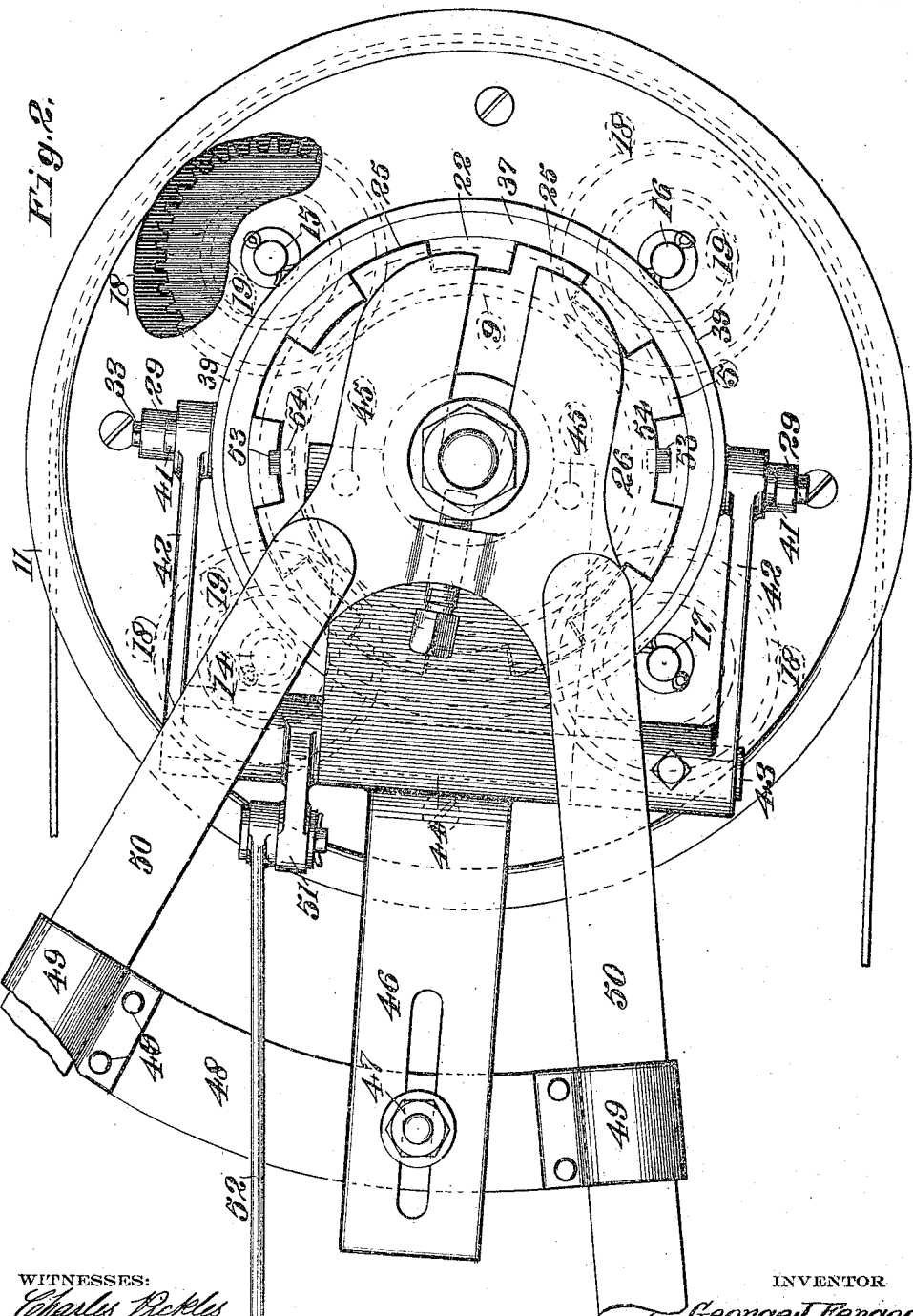

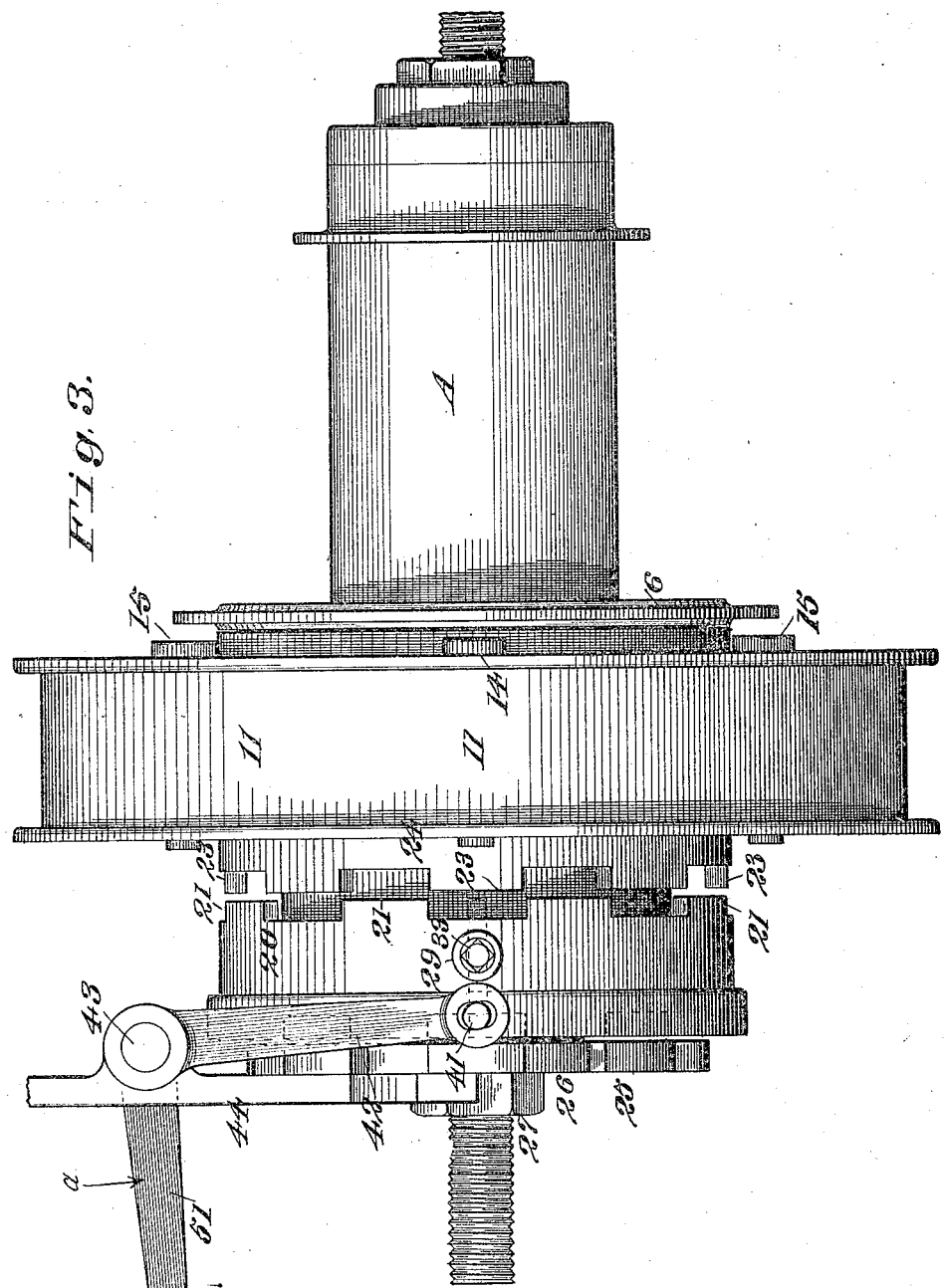

GEORGE J. FERGODO, OF SAN FRANCISCO, CALIFORNIA.

TWO-SPEED-TRANSMISSION MECHANISM FOR MOTOR-CYCLES.

1,125,282.  Specification of Letters Patent.  Patented Jan. 19, 1915.

Application filed May 19, 1913. Serial No. 768,693.

*To all whom it may concern:*

Be it known that I, GEORGE J. FERGODO, a citizen of the United States, residing in the city and county of San Francisco and State of California, have invented new and useful Improvements in Two-Speed-Transmission Mechanism for Motor-Cycles, of which the following is a specification.

This invention relates to a variable speed transmission mechanism.

The purpose of the present invention is to provide a simple, substantial and compact variable speed transmission mechanism which is especially adapted for use in connection with belt transmissions on motor-cycles.

The main object of the present invention is to provide a transmission mechanism, which is so constructed that it may be mounted directly on the hub of the driving wheel in such a position that it will be practically inclosed by the driving pulley where it can operate in conjunction with same.

Another object of the invention is to provide a gear selecting and controlling mechanism which is also adapted to be mounted upon the rear hub in a position where it may be directly connected with the transmission gears.

A further object is to provide suitable adjustments by which the wearing surfaces may be adjusted with relation to each other, thus insuring a smooth, silent operation of the different parts.

The invention consists of the parts and the construction and combination of parts as hereinafter more fully described and claimed, having reference to the accompanying drawings, in which—

Figure 1 is a longitudinal section of the hub showing the application of the invention. Fig. 2 is an end view of same showing its attachment with relation to the frame. Fig. 3 is a plan view of the transmission in position on the hub, showing the clutch in the neutral position.

Referring to the drawings, A indicates the hub of the rear driving wheel of a motor-cycle or like device, which may be suitably journaled upon antifriction bearings 2 and 3 in the usual manner. Suitably secured upon the hub, or as here shown by a key 4, is a driving pinion 5, the outer face of which is provided with an annular bearing extension 6.

Revolubly mounted upon the hub A and secured in position on same with relation to the driving pinion 5 by an antifriction thrust bearing 7 is a sleeve 8, upon the inner end of which is formed or otherwise secured a secondary driving gear 9. The sleeve 8 is also provided with an annular bearing shoulder 10, which, in conjunction with the annular extension 6, formed upon the driving pinion 5, is provided for the purpose of supporting a driving pulley 11; suitable ball bearings being interposed, as indicated at 12 and 13, between the gearings and the hub of the pulley for this purpose.

Suitably journaled upon stud bolts 14, 15, 16 and 17 are four pairs of intermediate gears 18 and 19. The gears 18 are so positioned as to intermesh with the secondary driving pinion 9, while the gears 19 will intermesh with the driving pinion 5.

Slidably mounted upon the sleeve 8 is a clutch ring 20, the opposite faces of which are provided with jaw members 21 and 22; the jaw members 21 being so positioned that they may be thrown into engagement with a similar set of interlocking members 23, formed upon the hub 24 of the driving pulley, while the jaw members 22 are so positioned that they may be thrown into engagement with similar interlocking members 25, formed upon a stationary disk 26 secured, as at 27, upon the stationary bearing member 2. The clutch ring 20 is provided with a pair of latch members 28 which consist of tubes 29 suitably secured in the ring 20, as at 30, in which is mounted balls 31 actuated by springs 32, the tension of which may be adjusted by set-screws 33. Formed on opposite sides of the sleeve 8, in a position registering with the tubes 29, are formed three pairs of depressions 34, 35 and 36, into which the balls are projected by the springs 32. The latch members 28 are provided for the purpose of controlling the position of the clutch ring 20 with relation to the opposite interlocking members 23 and 25. The outer clutch face 22, formed upon the ring 20, is surrounded by a ring 37 which is secured upon the ring 20 in any suitable manner, or, as here shown, by the screws 38. Surrounding the ring 37 is a secondary ring 39 which is provided with an inturned annular flange 40 provided for the purpose of securing the ring 39 with relation to the ring 37. Projecting from opposite sides of the ring 39 is a pair of stud projections 41, to which is pivotally secured a pair of lever arms 42, the inner ends of which arms 42 are secured upon a shaft 43 journaled upon a stationary bracket 44. One end of the stationary bracket 44 is secured by screws 45 upon the stationary plate 26, while the opposite end 46 is adjustably secured by a bolt 47 to a strap member 48 suitably secured, as at 49, to the rear forks 50 of the motorcycle frame. The shaft 43 is also provided with a crank arm 51, by which the shaft with connected lever arm 42, may be rocked from one position to another. The crank arm 51 may be connected in any suitable manner with a lever (not here shown) which may be placed within convenient reach of the operator, or, as here shown, may be connected to the lever by a link 52. It thus becomes possible for the operator to rock the shaft 43 with connected lever arms 42, which rocking movement would be transmitted through the ring 39 and clutch ring 20 to throw this into or out of engagement with the interlocking surfaces previously described.

In operation, it will be understood that the motorcycle is provided with any suitable form of engine (not here shown), between the driving shaft of which and the driving pulley 11 is interposed a suitable driving means. The clutch being thrown out of engagement it becomes possible to transmit rocking motion through the arms 42 to throw the clutch ring into or out of engagement with the opposite interlocking surfaces. Supposing it is desired to produce a direct drive, it may be accomplished in the following manner: Referring to Figs. 1 and 3, it will only be necessary to rock the arm 51 in the direction of arrow $a$ which will be immediately transmitted through the arms 42 to move the clutch ring 20, with projecting lugs 21, into engagement with the interlocking members 23 formed upon the hub of the driving pulley 11. This will cause the sleeve 8, with connected gear 9, to revolve in unison with the driving pulley and will thus prevent the intermediate gears 18 and 19 from revolving with relation to the driving pinion 5 and secondary driving pinion 9. The gears 18 and 19 thus form a lock between the pinions 5 and 9 and cause the transmission mechanism to revolve as a unit; the clutch being retained in this position by the latches 28 which are then registering with the depressions 36. A direct transmission is thus secured between the pulley 11 and the hub A. Neutral position of the clutch ring 20, with relation to the engaging members 25 and 23, is secured by rocking the arms 42 in such a position that the clutch ring with connected latch members 28 will be thrown into engagement with the depressions 35 formed on the opposite faces of the sleeve. A two to one drive is secured by rocking the arms 42 into such a position that the clutch ring 20, with connected latch members 28, is moved into register with the depressions 34. This will also throw the jaw members 22 into engagement with the interlocking members 25 on the stationary disk 26 and secure the clutch ring 20, with connected sleeve 8, against revolving movement. The gear 9, which is secured or otherwise formed upon the sleeve 8, being held stationary, will thus permit the driving pulley 11, in which the integral intermediate gears 18 and 19 are mounted, to revolve around the stationary gear 9, which movement is in turn transmitted through the gears 18 and 19 to the driving gear 5. The driving gear 5 is thus caused to revolve one revolution with relation to two of the driving pulley; the ratio between the various gears 9, 18, 19 and 5 being such that a two to one drive is secured.

It will be understood that the changing of the clutch ring 20 to secure different speeds should in most instances be preceded by throwing out the engine clutch (not here shown). This is necessary as it is not practical to throw the jaw members into engagement with each other without causing disastrous results, such as breaking the lug members, by throwing these into engagement with each other while the parts are revolving at a high speed. As before described, it will be understood that the clutch ring 20 and the sleeve 8 are secured with relation to each other to prevent revolution of one with relation to the other. This is accomplished by splining the clutch ring 20, as at 53, with relation to the sleeve 8; a key 54 being secured in either one member or the other.

By referring to the drawings it will be seen that the driving pulley, in which the four pairs of intermediate pinions 18 and 19 are revolubly mounted, is suitably journaled in antifriction ball-bearings 12 and 13 upon the sleeve 8 and annular extension 6 formed upon the driving pinion 5 and that the sleeve 8 is partly journaled upon the thrust bearings 7.

For the purpose of taking up any wear between the gears and the different antifriction bearings an adjustable set collar 55 is provided. This is threaded upon the outer end of the hub A and may be advanced or retracted, as the case may be, to adjust the different parts with relation to each other; movement being transmitted through the thrust bearing and sleeve 8 to adjust the parts with relation to each other. A suitable space, as indicated at 56, is provided between the end of the sleeve 8 and the driving pinion to permit this adjustment.

The transmission mechanism here shown is neat in appearance and prompt and reliable in its actions and takes less space than other forms of transmission mechanism heretofore provided as the driving pulley is utilized for the purpose of forming an inclosing casing for the transmission gearing slippage between the different parts, when transmitting directly or secondarily, is positively prevented, as interlocking members are provided in the clutch which will prevent this.

The materials and finish of the several parts of the apparatus are such as experience and judgment of the manufacturer may dictate.

Having thus described my invention, what I claim and desire to secure by Letters Patent is—

1. In combination with a hub and a driving pinion thereon, a sleeve revoluble on the hub and having a driving gear, a driving pulley having teeth, gears journaled on said pulley and meshed with the pinion and said gear, a clutch member slidable on the sleeve and having clutch teeth on its sides, a stationary element having teeth to engage with the teeth on one side of the clutch member, the teeth on the opposite side of the clutch member being for engagement with the pulley teeth, a ring secured to the clutch member, a secondary ring surrounding the first ring and having an inturned annular flange which engages the inner face of the first named ring, a pair of diametrically opposed studs connected to the secondary ring, arms connected to the studs, a turnable shaft, said arms being rigidly connected to the ends of said shaft, and a crank arm connected to the shaft to turn the latter.

2. In combination with a hub, a driving pinion secured thereto and having an annular, peripheral extension, a sleeve rotatable on the hub and having an annular peripheral shoulder spaced from the extension, a driving pulley received in the space between said shoulder and extension so as to be held thereby against lateral movement, said sleeve having a driving gear, said pulley having a clutch face on one side extending beyond the extension of the sleeve, an axle for supporting the hub, a disk rigidly connected to the axle and extending over the outer end of the sleeve and having peripheral clutch teeth, and a clutch member slidable on the sleeve and having teeth to engage the peripheral clutch teeth of the disk and a clutch face to engage the clutch face of the driving pulley.

3. In combination with a hub, a driving pinion secured thereto and having an annular, peripheral extension, a sleeve rotatable on the hub and having an annular peripheral shoulder spaced from the extension, a driving pulley received in the space between said shoulder and extension so as to be held thereby against lateral movement, said sleeve having a driving gear, said pulley having a clutch face on one side extending beyond the extension of the sleeve, an axle for supporting the hub, a disk rigidly connected to the axle and extending over the outer end of the sleeve and having clutch teeth, a clutch member slidable on the sleeve and having teeth to engage the teeth of said disk, a ring on said clutch member, a second ring engaged over the first ring and having a flange to engage the inner side of the first ring, and means connected to the second ring to move the same and therewith the clutch member.

4. In combination with a hub, a driving pinion secured thereto, a ball bearing on the outer end of the hub, a sleeve having a gear and having its outer end formed to engage with said ball bearing and to surround the latter, an axle for supporting the hub, a stationary element on the axle which extends over the outer end of the sleeve and over the ball bearing, said element having a clutch face, a driving pulley having a clutch face, gears on the pulley meshed with the sleeve gear and the pinion, a clutch member having clutch faces to engage the clutch face of the stationary element and the clutch face of the driving pulley, and means to shift the clutch member.

In testimony whereof I have hereunto set my hand in the presence of two subscribing witnesses.

GEORGE J. FERGODO.

Witnesses:
JOHN H. HERRING,
W. W. HEALEY.